United States Patent [19]
Ito

[11] Patent Number: 6,077,135
[45] Date of Patent: Jun. 20, 2000

[54] TORSIONAL DAMPER FOR WATERCRAFT PROPULSION SYSTEM

[75] Inventor: Kazumasa Ito, Shizuoka, Japan

[73] Assignee: Yamaha Hatsudoki Kabushiki Kaisha, Japan

[21] Appl. No.: 08/994,156

[22] Filed: Dec. 19, 1997

[30] Foreign Application Priority Data

Dec. 19, 1996 [JP] Japan .................................. 8-355303

[51] Int. Cl.$^7$ ................................................ B63H 23/00
[52] U.S. Cl. .............................. 440/83; 114/55.5; 440/52
[58] Field of Search ................................. 114/211, 55.5, 114/55.51; 440/38, 83, 52; 464/180

[56] References Cited

U.S. PATENT DOCUMENTS

| | | |
|---|---|---|
| 4,568,293 | 2/1986 | Yazaki ..................................... 114/211 |
| 4,689,028 | 8/1987 | Murase ...................................... 440/88 |
| 4,747,796 | 5/1988 | Iwai et al. . |
| 4,765,075 | 8/1988 | Nakase et al. . |
| 4,787,328 | 11/1988 | Inoue .................. 114/183 R |
| 4,813,898 | 3/1989 | Nakase et al. . |
| 4,976,638 | 12/1990 | Grinde . |
| 5,074,812 | 12/1991 | Watanabe ................................... 440/52 |
| 5,254,023 | 10/1993 | Kobayashi . |
| 5,372,526 | 12/1994 | Ozawa et al. . |
| 5,437,568 | 8/1995 | Kobayashi . |
| 5,558,456 | 9/1996 | Nakase et al. . |

OTHER PUBLICATIONS

Toboldt, et al., "Automotive Encyclopedia: Fundamental Principles, Operation, Contruction, Service, and Repair", The Goodheart–Willcox Company, Inc., 1995, Chapter 10, p. 103.

Newton, et al., "The Motor Vehicle", SAE International, Twelfth Edition, 1996, pp. 137–138.

*Primary Examiner*—Ed Swinehart
*Attorney, Agent, or Firm*—Knobbe, Martens, Olson & Bear, LLP

[57] ABSTRACT

A vibrational damper reduces torsional vibration within a crankshaft of a marine engine. The vibrational damper is located on an end of the crankshaft opposite of the flywheel and includes an inertia ring that adds additional mass to this opposite end. In addition, the vibrational damper includes an elastic member that suspends the inertia ring about the crankshaft. The elastic member effectively dampens torsional vibrations. The torsional damper desirably is cooled by an air flow so as to maintain it's dampening efficiency. A ventilation duct, which is positioned directly above the vibrational damper, supplies the cooling air. Cooling is enhanced by locating a bilge system inlet below and slightly behind the vibrational damper. An air flow stream occurs between the duct and the bilge inlet and across the torsional damper to cool the torsional damper.

30 Claims, 4 Drawing Sheets

TORSIONAL DAMPER FOR WATERCRAFT PROPULSION SYSTEM

BACKGROUND OF THE INVENTION

1. Field of the Invention

The present invention relates in general to a vibration reduction mechanism, and in particular to a torsional damper for use in the propulsion system for a watercraft.

2. Description of Related Art

In many propulsion systems that propel small watercraft, such as personal watercraft and small jet boats, an internal combustion engine drives a jet propulsion unit. For this purpose, a flexible coupling often couples an output shaft of the engine to the impeller shaft of a jet pump unit. The impeller shaft in turn drives a propulsion device, such as an impeller within the jet pump unit.

The propulsion systems of most small watercraft today use two or three cylinder engines. Such engines, however, can be prone to internal vibrational problems. For instance, the explosive forces acting on the pistons and the inertia forces of the moving parts vary in intensity as the pistons of the engine reciprocate. The resulting variation of force or torque on the crankshaft causes the crankshaft to twist in an oscillatory fashion so as to transmit torsional vibration. Torsional vibration is more noticeable at certain speeds and can be irritating to the rider. Such vibrations may also damage the crankshaft. That is, as the shaft winds up and relaxes under the oscillatory torsional force, alternating stresses internal to the shaft occur. Such stresses can cause failure under some conditions.

Prior watercraft propulsion systems have not adequately isolated the watercraft hull from such vibration, nor have they included a suitable mechanism to shift the severity of the resulting resonance. Vibration-absorbing engine mounts have been used in an attempt to lessen vibration transmission from the engine to the watercraft hull. Although somewhat effective in reducing the engine vibration felt by the rider, such mounts do not dampen torsional vibrations within the crankshaft.

SUMMARY OF THE INVENTION

An aspect of the present invention involves a torsional damper used with a propulsion system of a watercraft. The watercraft comprises a hull containing an internal combustion engine of the propulsion system. The engine is positioned within an engine compartment of the hull and includes an output shaft. The output shaft drives an impeller shaft of a jet propulsion unit so as to propel the watercraft. The engine includes a flywheel that is coupled to the output shaft and is located on a front side of the engine. A torsional damper is coupled to the output shaft on a rear side of the engine, and on an end of the output shaft opposite of the flywheel. The torsional damper is also positioned near an interconnection between the output shaft and the impeller shaft.

Another aspect of the present invention involves a watercraft comprising a hull that contains an internal combustion engine of a propulsion system. The engine is positioned within an engine compartment of the hull and includes an output shaft. The output shaft drives an impeller shaft of a jet propulsion unit through a coupling in order to propel the watercraft. A torsional damper is positioned about the coupling so as to reduce torsional vibration within the output shaft.

An additional aspect of the present invention involves locating a torsional damper, which is coupled to an output shaft of a watercraft engine, near an opening of a ventilation duct. In this manner, the torsional damper is positioned within the path of air flow that flows through the ventilation duct so as to cool the torsional damper. In addition or in the alternative to this cooling approach, the torsional damper can be located near an influent end of a bilge system pick-up line. The influent end and the torsional damper desirably are positioned relative to each other such that air and water suctioned by the bilge system will be drawn across the torsional damper to provide cooling.

Further aspects, features, and advantages of the present invention will become apparent from the detailed description of the preferred embodiment that follows.

BRIEF DESCRIPTION OF THE DRAWINGS

The above-mentioned and other features of the invention will now be described with reference to the drawings of a preferred embodiment of the present watercraft. The illustrated embodiment is intended to illustrate, but not to limit the invention. The drawings contain the following figures.

DETAILED DESCRIPTION OF THE PREFERRED EMBODIMENT OF THE INVENTION

The present torsional damping mechanism has particular utility for use with a propulsion system of a personal watercraft, and thus, the following describes the damping mechanism in the context of a personal watercraft. This environment of use, however, is merely exemplary. The present torsional damping mechanism can be readily adapted by those skilled in the art for use with other types of watercraft, including, but without limitation, small jet boats and the like.

Figure 1:
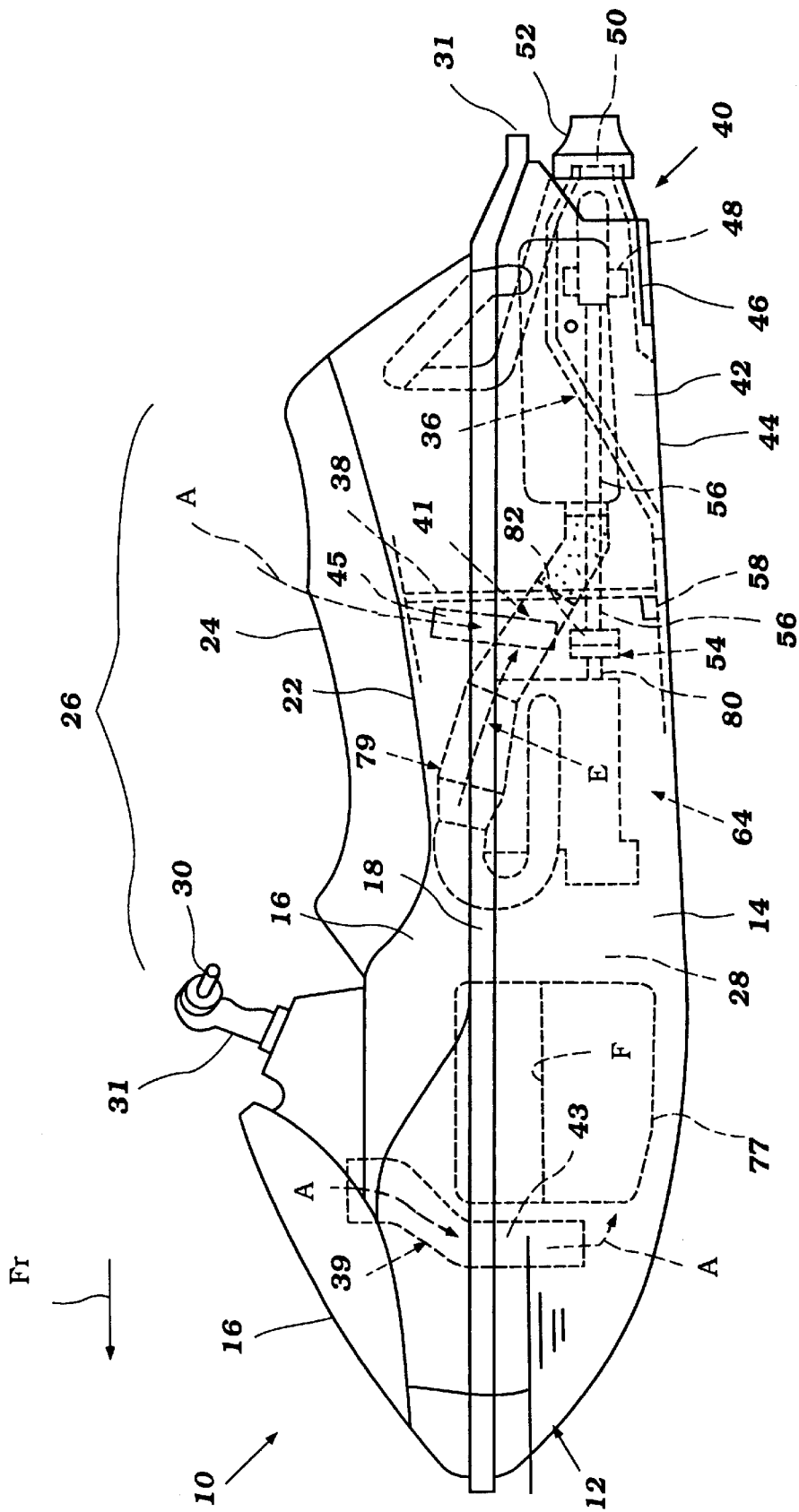
FIG. 1 is a side elevational view of the small watercraft configured in accordance with a preferred embodiment of the present invention, with various internal components illustrated in phantom.
Figure 2:
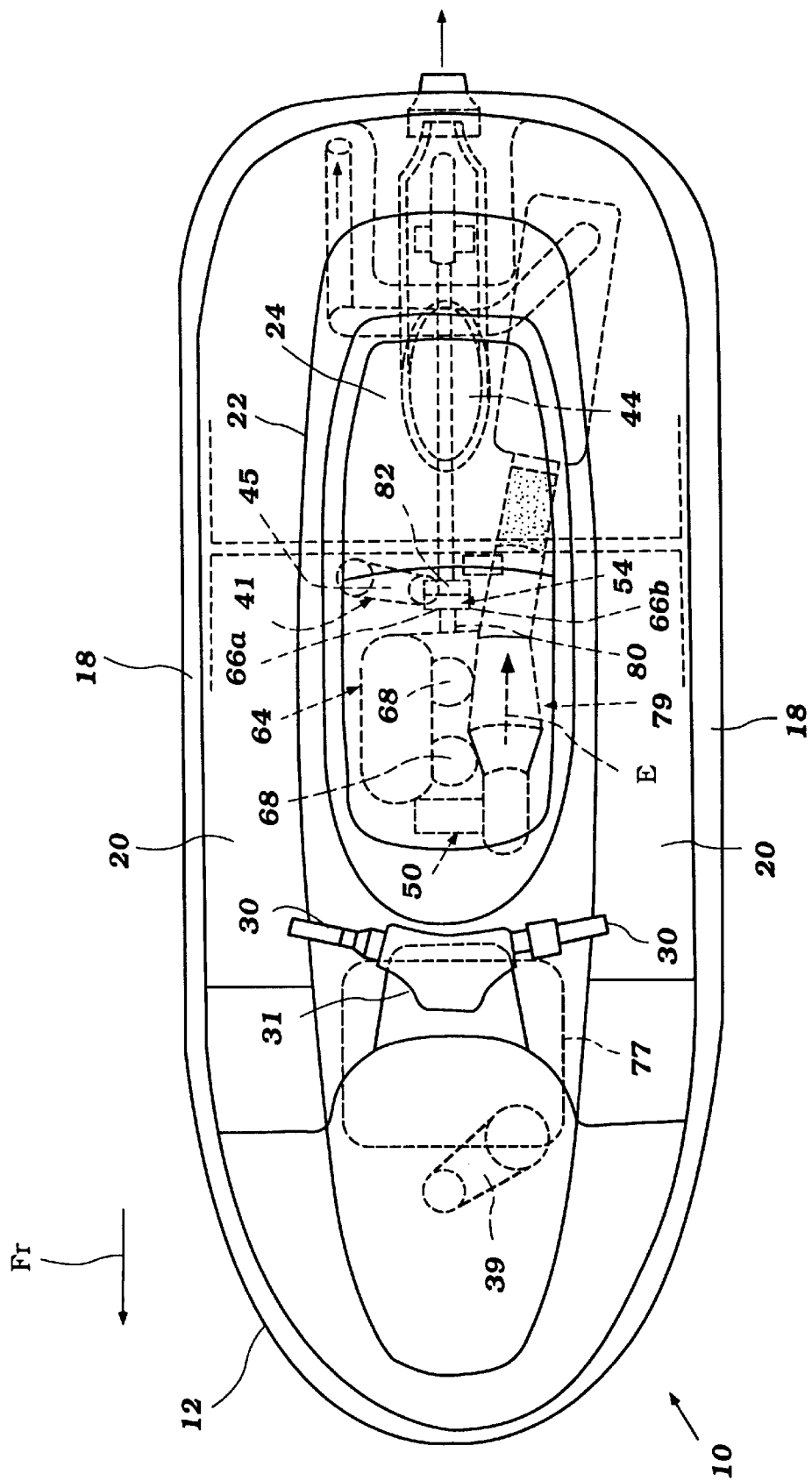
FIG. 2 is a top plan view of the watercraft of FIG. 1 and illustrates several internal components in phantom.

With initial reference to FIGS. 1 and 2, the watercraft 10 includes a hull 12 that is formed by a lower hull section 14 and an upper deck section 16. The hull sections 14, 16 are formed of a suitable material such as, for example, a molded fiberglass reinforced resin, and can be made by any of a wide variety of methods. For instance, the deck 16 and the hull 14 can each be formed using a sheet molding compound (SMC), i.e., a mixed mass of reinforced fiber and thermal setting resin, that is processed in a pressurized, closed mold. The lower hull section 14 and the upper deck section 16 are fixed together around their peripheral edges in any suitable manner. For instance, the peripheral flanges of the upper deck section 16 and the lower hull section 14 can nest together and be bonded.

The upper deck section 16 and the lower hull portion 14 together define a pair of raised gunnels 18 positioned on opposite sides of the aft end of the upper deck assembly 16. The raised gunnels define a pair of foot areas (FIG. 2) that generally extend longitudinally and parallel to the sides of the watercraft 10. In this position, the operator and any passenger sitting on the watercraft 10 can place their feet in the foot areas 20 with the raised gunnels 18 shielding the feet and lower legs of the riders. A non-stick (e.g., rubber) mat desirably covers the foot areas 20 to provide increased grip and traction for the operator and the passengers.

Toward the aft end of the watercraft 10, a seat pedestal 22 rises above the foot areas 20. The pedestal 22 supports a seat cushion 24 to form a seat assembly 26. In the illustrated embodiment, the seat assembly 26 has a longitudinally extending, straddle-type shape that may be straddled by an operator and by at least one or two passengers. For this purpose, the raised pedestal 22 has an elongated shape and extends longitudinally generally along a center line of the watercraft 10. The seat cushion 24 is removably attached to the pedestal 22 by a quick-release latching assembly, as known in the art. An access opening (not shown) is formed (at least in part) beneath the seat cushion 24 to provide access into an engine compartment 28 formed within the hull 12.

A control mast 31 is formed just forward of the seat assembly 26. The control mast includes a steering column that supports a steering operator 30. In the illustrated embodiment, the steering operator 30 is a handlebar assembly; however, other steering operators, such as, for example, a steering wheel or a control stick (i.e., joystick), also can be used. The steering column operates a steering actuator (not shown). The actuator affects steering movement of the watercraft 10 in the manner described below.

Towards the stem 34 of the watercraft 10, the lower hull section 14 includes an upwardly extending recessed channel or tunnel 36. The tunnel 36 has a generally parallel-piped shape and opens through the rear of the stern 34, as understood from FIG. 1. The tunnel 36 terminates at its front end in a front wall. In the illustrated embodiment, the front wall forms a portion of a bulkhead 38 within the hull 12. The bulkhead 38 separates the tunnel 36 from the engine compartment 28.

A jet propulsion unit 40 propels the watercraft 10. The jet propulsion unit 40 is mounted within the tunnel 36 by a plurality of bolts (not shown). An intake duct 42 of the jet propulsion unit 40 defines an inlet opening 44 on the underside of the lower hull section 14. The inlet duct 42 leads to an impeller housing 46 in which an impeller 48 of the jet pump 40 operates. The impeller housing 46 also acts as a pressurization chamber and delivers the water flow from the impeller to a discharge nozzle 50.

A steering nozzle 52 is supported at the downstream end of the discharge nozzle 50 by a pair of vertically extending pivot pins (not shown). The steering nozzle 52 includes a lever on one side that is moved by the actuator (e.g., a bowden-wire cable) that is controlled by the steering operator 30. In this manner, steering movement is effected by movement of the operator 30. A propulsion stream of water exits the steering nozzle to propel the watercraft.

An impeller shaft 56 drives the impeller 48. The impeller shaft 56 extends forward of the jet propulsion unit 40 through a cylindrical casing 60 that is integral with the inlet duct 42. The impeller shaft 56 extends through the bulkhead 38 and is desirably supported thereon by a rubber bearing/seal assembly 62. The assembly 62 includes grease-backed seals to inhibit water from the intake duct 42 from entering the engine compartment 28.

The lower hull portion 14 principally defines the engine compartment 28 forward of the bulkhead 38. Except for the ventilation system, which desirably include a plurality of air ducts 39, 41, the engine compartment 28 is normally sealed so as to enclose an engine 64 and a fuel system (not shown) of the watercraft 10 from the body of water in which the watercraft 10 is operated.

The front ventilation duct 39 desirably receives a flow of air from outside the watercraft hull and guides the air flow A into the engine compartment 28 through at least one generally upstanding conduit 43. Similarly, the rear ventilation duct guides air A through at least another generally upstanding conduit 45 into the engine compartment 28 at a point behind the engine 64. Air A desirably flows into the rear duct 41 from a point beneath the seat 24.

The internal combustion engine 64 drives the impeller shaft 56 to power the jet propulsion unit 40. The engine 64 is positioned within the engine compartment 28 and is mounted centrally within the hull 12. Vibration-absorbing engine mounts (not shown) typically secure the engine 64 to the lower hull section 14.

Figure 3:
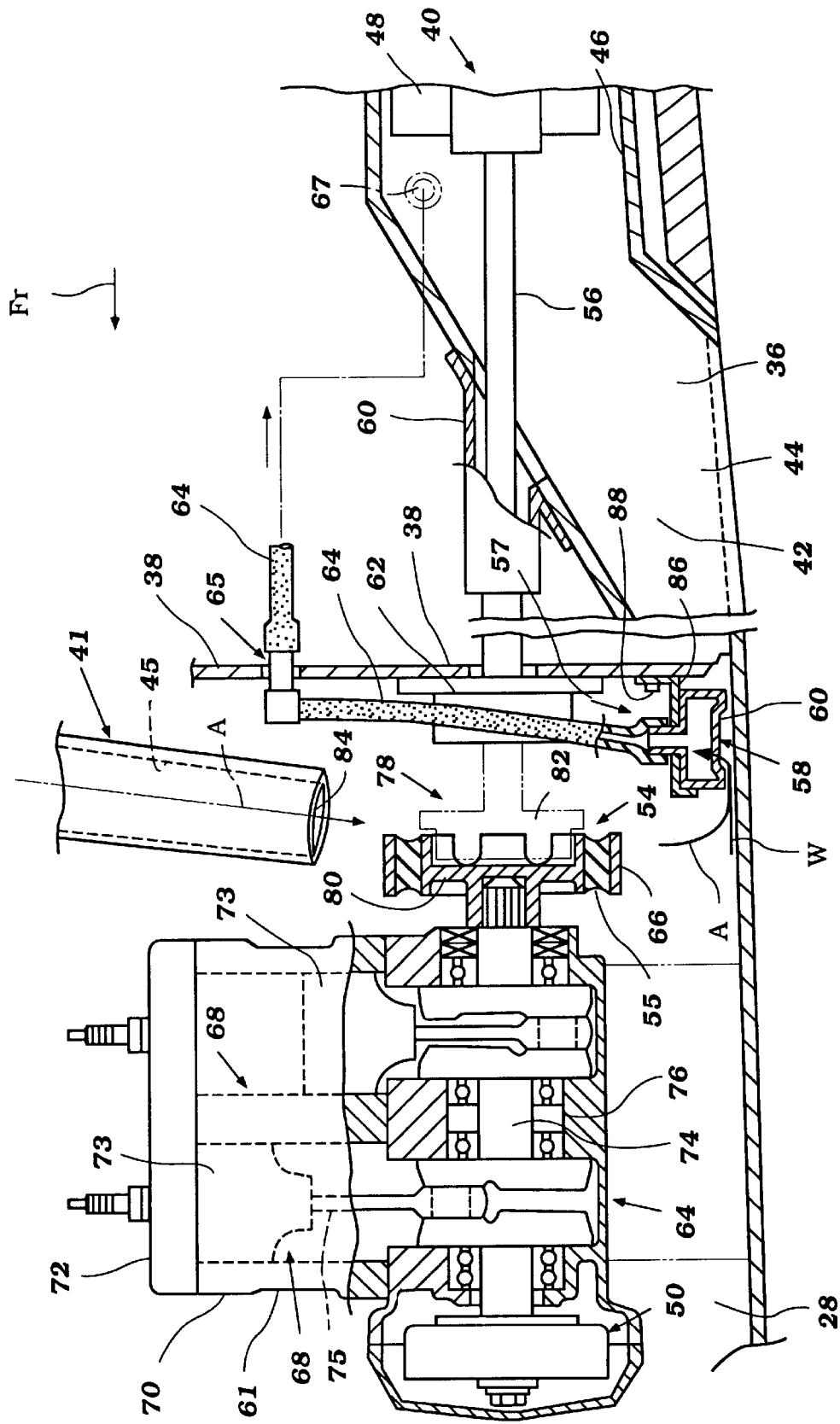
FIG. 3 is an enlarged sectional side view of the watercraft of FIG. 1 and illustrates a preferred embodiment of a torsional damper used with the propulsion system.

In the illustrated embodiment, as seen in FIG. 3, the engine 64 includes two inline cylinders 68. The engine 64 is positioned such that the row of cylinders 68 lies parallel to the longitudinal axis of the watercraft, running bow to stern, as best seen in FIG. 2. The engine can operate on either a two or four stroke principal. Those skilled in the art, however, will readily appreciate that the present propulsion system can include any of a variety of engine types having other numbers of cylinders, having other cylinder arrangements, and operating on other combustion principals.

A cylinder block 70 and a cylinder head assembly 72 desirably form the cylinder 68 of the engine 64. A piston 73 reciprocates in each cylinder 68. The pistons together drive a crankshaft 74, in a known manner. The crankshaft 74 is desirably journaled within a crankcase 76. A connecting rod 75 links the corresponding piston to the crankshaft 74. The corresponding cylinder bore, piston and cylinder head of each cylinder 68 form a variable-volume chamber, which at minimum volume defines a combustion chamber.

Each combustion chamber communicates with a charge former of an induction system (not shown). The induction system receives air through a throttle device and fuel from a fuel supply system. A conventional fuel tank 77 (see FIG. 1) of the fuel supply system stores a supply of fuel F. The induction system produces a fuel charge that is delivered to the cylinder 68 in a known manner.

An exhaust system 79 discharges engine exhaust gases from the watercraft. In the illustrated embodiment, the exhaust system includes a manifold that communicates with the exhaust ports of the cylinders 68. The exhaust manifold communicates with an expansion chamber located at an elevated level relative to the exhaust ports. The expansion chamber communicates with a water box. In the illustrated embodiment, the water box is positioned along side the tunnel 36 at a point behind the bulkhead 38. An exhaust pipe connects to the water box, extends over the tunnel 36 and opens at a discharge end. In the illustrated embodiment, the discharge end is located on the transom of the watercraft hull; however, other locations are possible, such as, for example, within the tunnel 36 as now known in the art.

The crankshaft 74 drives a flywheel magneto 50. The flywheel magneto 50 desirably lies on the front side of the engine and is enclosed within a housing. The flywheel magneto 50 has a conventional construction and functions for conventional purposes.

The crankshaft 74 functions as an output shaft for the engine 64 and directly drives the impeller shaft 56. A flexible coupling 78 interconnects the engine crankshaft 74 to the impeller shaft 56. The coupling 78 is desirably positioned near the aft end of the engine 64 just forward of the support bearing 62 on the bulkhead 38. The coupling directly drives the impeller shaft 56 such that the shafts 74, 56 rotate together.

In the illustrated embodiment, the coupling includes a drive element 80 and a driven element 82. The drive element 80 is coupled to the rear end of the crankshaft 74 by a spline connection. The driven element 82 is connected to or is unitarily formed with the front end of the impeller shaft 56. The elements are coupled together in a manner permitting a degree of angularity between the two shafts 56, 74. In the exemplary embodiment, the drive element 80 has a larger outer hub into which a portion of the driven element 82 is inserted so as to couple together these components. The outer hub of the drive element 80 desirably has a larger diameter than the crankshaft 74.

Located adjacent to the coupling is a torsional damper 54. The torsional damper 54 desirably is located behind the engine 64, and on a side of the engine opposite of the flywheel magneto 50. In the illustrated embodiment of FIG. 3, the torsional damper 54 comprises an inertia ring 66 that is supported about the outer periphery of the drive element's outer hub by an elastic member 55 (e.g., rubber). The elastic member 55 desirably is isotropic to effectively dampen vibration amplitude and dissipate energy as heat. The inertia ring 66 is desirably made of a suitable material, such as metal, to provide a sufficient amount of mass about the exterior of the elastic member 55.

The inertia ring 66 fits around the periphery of and coaxially with the crankshaft 74. The ring 66 is desirably constructed such that the inner diameter of the ring 66 is relatively larger than the outer diameter of the crankshaft 74. In the illustrated embodiment, the inertia ring 66 has a cylindrical configuration and is formed by a plurality of semi-cylindrical segments 66a, 66b. The elastic body 55, which can be composed of rubber, foam, epoxy or some other flexible material, is compressed between the outer surface of the coupling's hub and the ring 66. In the alternative or in addition thereto, the elastic member 55 can be bonded between the ring 66 and the coupling outer hub.

Figure 4:
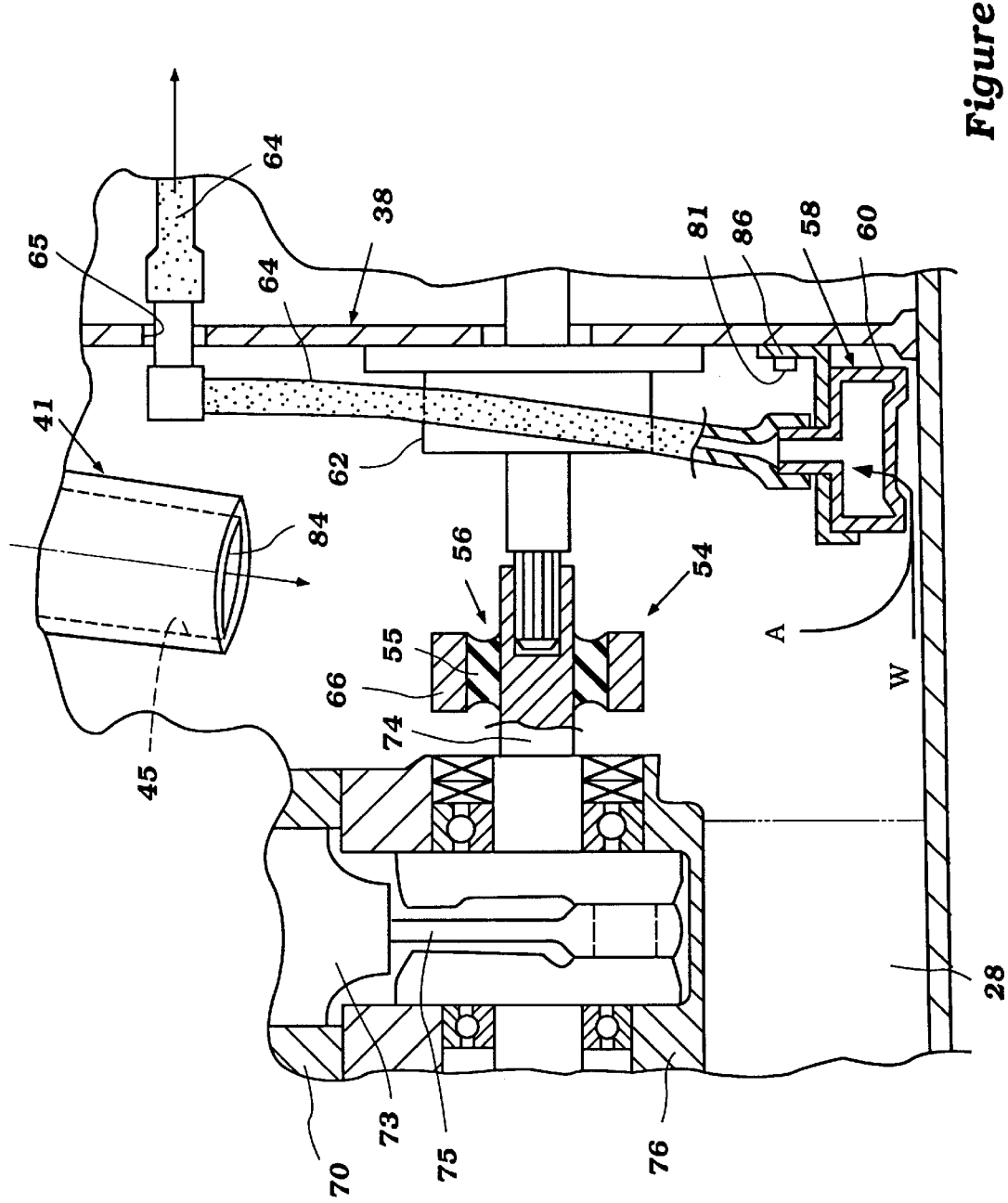
FIG. 4 is an enlarged sectional side view of a watercraft that is similar to that shown in FIG. 3, and illustrates another preferred embodiment of the torsional damper.

FIG. 4 depicts an alternate embodiment of a torsional damper 54 constructed in accordance with the present invention, in which the crankshaft 74 is directly connected to the impeller shaft 56 by a spline connection. In this embodiment, the ring 66 is fit directly around the crankshaft 74, with the elastic body 55 compressed between the ring 66 and the crankshaft 74.

In both embodiments, the torsional dampers add mass to the end of the crankshaft opposite the flywheel to minimize crankshaft twist. The elastic member 55 also absorbs and deadens much of the vibration. Through this process, however, heat is created. The internal friction within the elastic member that results manifests as heat that degrades the dampening effectiveness of the elastic member.

To reduce this effect, the torsional damper 54 desirably is located in the vicinity of a cooling source. In the illustrated embodiment, one such cooling source is the rear air duct 41. A lower end 84 of the conduit 45 is located just above the torsional damper 54 so as to direct the flow of air A onto the torsional damper 54 and thereby cool the damper 54. In the alternative or in addition to this approach, another source of cooling can be achieved by placing the torsional damper 54 in the vicinity of an inlet of a bilge system 57.

In the embodiment illustrated in FIG. 3, the bilge system 57 includes a water pick-up 58 located just forward of the bulkhead 38. The pick-up desirably is secured to the bulkhead by a bracket 86 and fasteners 88. In this position, the pick-up 58 lies beneath and slightly behind the coupling 78 and torsional damper 54. As schematically illustrated in FIG. 3, a portion of the air flow A from the ventilation duct 41 flows over the torsional damper 54 and into the pick-up 58. This flow also may entrain water, if present within the hull, to also pass over and cool the torsional damper 54.

A discharge conduit 64 is connected to the bilge pick-up 58 at its lower end and extends through a hole 65 in the bulkhead 38 at a point above the rotational axis of the crankshaft 74. The conduit 64 communicates with the low pressure side of the jet pump unit 40. That is, the conduit 64 is connected to a port 67 on the jet pump unit 40 that is located upstream of the impeller 48. The pump unit 40 draws water W and air A through the conduit 64 under the generated pump force. In the alternative, the conduit 64 can connect to a Venturi device, such as that illustrated in U.S. Pat. No. 4,850,908, entitled "Drawing Away Device Of Bilge Water For Water Jet Propulsion," that is hereby incorporated by reference, in order to achieve the same result.

With reference back to the embodiment illustrated in FIG. 3, during watercraft operation, the movement of water in the tunnel 36 generates a suction in the discharge conduit 64 through a process well known in the art as the "venturi-effect." This suction draws water W and/or air A located in the engine compartment into the pick-up 58 through one or more suction holes 60 located on the bottom of the pick-up 58. This water W and/or air A is then drawn through the conduit 64 and is discharged through the discharge opening 67. The pickup 58 is located at the aft lower end of the engine compartment, which is typically the lowest point in the engine compartment during normal forward operation of the watercraft, thus ensuring that the maximum amount of water is drained from the engine compartment.

The resulting air flow A between the end 84 of the ventilation duct 41 and the influent end of the bilge system 57 (i.e., the pick-up 58) and thus across the torsional damper 54, sufficiently cools the damper 54 in order to prevent over heating of the elastic member 55. As a result, the vibrational damper 54 continues to effectively dampen torsional vibrations in the crankshaft 74, even at high revolutional speed and after long durations of operation.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A watercraft comprising a hull containing an internal combustion engine of a propulsion system within an engine compartment, said engine including an output shaft connected by a flexible coupling to an impeller shaft of a jet propulsion unit, said engine including a flywheel coupled to said output shaft and located on a front side of said engine, and a torsional damper coupled to said output shaft on a rear side of said engine with at least a portion of said torsional damper located about said flexible coupling.

2. A watercraft as in claim 1, wherein said torsional damper comprises a ring and an elastic member.

3. A watercraft as in claim 1, wherein at least a portion of said torsional damper is positioned between said flexible coupling and said rear side of said engine.

4. A watercraft as in claim 2, wherein said ring has a cylindrical configuration and is formed by a plurality of semi-cylindrical segments.

5. A watercraft as in claim 2, wherein said elastic member is comprised of an isotropic material.

6. A watercraft as in claim 2, wherein said elastic member has less mass than said ring.

7. A watercraft as in claim 1 additionally comprising a bilge system including a pick-up line, an influent end of the pick-up line being located within the engine compartment in the vicinity of said torsional damper.

8. A watercraft as in claim 7, wherein said influent end of said pick-up line is located beneath said torsional damper.

9. A watercraft as in claim 7, wherein said influent end of said pick-up line is located to the rear side of said torsional damper.

10. A watercraft as in claim 7, wherein said pick-up line communicates with said jet propulsion unit.

11. A watercraft as in claim 1 additionally comprising at least one ventilation duct which communicates with said engine compartment, an opening of the ventilation duct being located in the vicinity of said torsional damper.

12. A watercraft as in claim 11, wherein said opening of said ventilation duct is positioned directly above said torsional damper.

13. A watercraft comprising a hull including an engine compartment, a propulsion system including an internal combustion engine contained within an engine compartment, said engine including an output shaft driving an impeller shaft of a jet propulsion unit through a coupling, a torsional damper positioned about said coupling, and at least one ventilation duct that communicates with said engine compartment, said ventilation duct positioned within said engine compartment such that air travelling into said engine compartment through said ventilation duct is directed at said torsional damper.

14. A watercraft as in claim 13, wherein said torsional damper comprises a weighted element supported about said coupling by an isotropic element.

15. A watercraft as in claim 14, wherein said weighted element has a sufficient mass so as to change the natural frequency of said propulsion system.

16. A watercraft as in claim 15, wherein said weighted element comprises a metal ring.

17. A watercraft as in claim 14, wherein said isotropic element is rubber.

18. A watercraft as in claim 13, wherein an opening of said ventilation duct is located directly above said torsional damper.

19. A watercraft as in claim 13 additionally comprising a bilge system including a pick-up line, an influent end of said pick-up line being located within said engine compartment in the vicinity of said torsional damper.

20. A watercraft as in claim 21, wherein said influent end of said pick-up line is located beneath said torsional damper.

21. A watercraft as in claim 21, wherein said influent end of said pick-up line is located to the rear side of said torsional damper.

22. A watercraft as in claim 19, wherein said ventilation duct, pick-up line and torsional damper are positioned within said engine compartment such that said torsional damper is located in-line with an opening in said ventilation duct and said influent end of said pick-up line.

23. A watercraft comprising a hull defining an engine compartment, said hull defining a longitudinal axis, an internal combustion engine of a propulsion system disposed within said engine compartment, said engine including a rear side and an output shaft extending rearward from said rear side of said engine, a propulsion unit carried by said hull and including a drive shaft, said drive shaft being coupled to a spline connection to said output shaft of said engine, and a torsional damper coupled to said output shaft on said rear side of said engine and disposed such that at least a portion of said torsional damper is located in a longitudinal direction between said spline connection and said rear side of said engine.

24. A watercraft as in claim 23, wherein a portion of said output shaft cantilevers from said rear side of said engine.

25. A watercraft as in claim 24, wherein said torsional damper is spaced from said rear side of said engine.

26. A watercraft as in claim 23, wherein said torsional damper comprises a ring and an elastic member.

27. A watercraft as in claim 26, wherein said ring has an inner diameter greater than an outer diameter of said output shaft and is positioned about said output shaft with said elastic member located between said ring and said output shaft.

28. A watercraft as in claim 26 additionally comprising a flexible coupling that cooperates with said spline connection to connect together said engine output shaft and said propulsion unit drive shaft, and said torsional damper being disposed about at least a portion of said flexible coupling.

29. A watercraft as in claim 28, wherein said flexible coupling is disposed between said spline connection and said rear side of said engine.

30. A watercraft as in claim 23, wherein said torsional damper comprises a weighted element supported by an isotropic element relative to said output shaft.

* * * * *